(12) United States Patent
Ferry, III et al.

(10) Patent No.: US 6,857,558 B2
(45) Date of Patent: Feb. 22, 2005

(54) METAL LAMINATION METHOD AND STRUCTURE

(76) Inventors: Robert Thomas Ferry, III, 16005 SE. 322ND St., Auburn, WA (US) 98092; William Cottrell, 8914 Colony La. SE., Tenino, WA (US) 98589; Charles Bybee, 22964 NE. 26th Pl., Sammamish, WA (US) 98074

( * ) Notice: Subject to any disclaimer, the term of this patent is extended or adjusted under 35 U.S.C. 154(b) by 0 days.

(21) Appl. No.: 10/375,525

(22) Filed: Feb. 26, 2003

(65) Prior Publication Data

US 2003/0162050 A1 Aug. 28, 2003

Related U.S. Application Data

(60) Provisional application No. 60/361,070, filed on Feb. 27, 2002.

(51) Int. Cl.$^7$ .................. B23K 20/04; B23K 20/14; B32B 15/01; B32B 3/26
(52) U.S. Cl. ............ 228/190; 228/219; 228/235.2; 228/262.71; 428/635; 428/660; 428/614; 428/609
(58) Field of Search ............... 428/635, 660, 428/614, 609, 612; 228/190, 218, 221, 220, 235.2, 219, 262.71

(56) References Cited

U.S. PATENT DOCUMENTS

| | | | | |
|---|---|---|---|---|
| 3,201,863 A | | 8/1965 | Sayre | 29/472.3 |
| 3,748,721 A | * | 7/1973 | Alexander | 228/185 |
| 3,963,589 A | * | 6/1976 | Kushida et al. | 205/206 |
| 4,137,616 A | * | 2/1979 | Veitl et al. | 29/17.3 |
| 4,354,301 A | | 10/1982 | Takeuchi et al. | 29/160.6 |
| 4,399,611 A | * | 8/1983 | Maringer | 30/350 |
| 4,816,347 A | * | 3/1989 | Rosenthal et al. | 428/615 |
| 4,881,430 A | * | 11/1989 | Hubbard | 76/104.1 |
| 5,226,578 A | * | 7/1993 | Douglas | 228/157 |
| 5,253,796 A | * | 10/1993 | Stacher et al. | 228/193 |
| 5,410,133 A | | 4/1995 | Matsen et al. | 219/645 |
| 5,425,494 A | * | 6/1995 | Rosenthal et al. | 228/124.5 |
| 5,532,460 A | * | 7/1996 | Okato et al. | 219/621 |
| 5,579,988 A | * | 12/1996 | Schutz et al. | 228/235.2 |
| 5,797,239 A | | 8/1998 | Zaccone et al. | 521/793.1 |
| 5,815,790 A | * | 9/1998 | Billgren et al. | 419/5 |
| 6,564,689 B1 | * | 5/2003 | Billgren | 89/16 |
| 2003/0119599 A1 | * | 6/2003 | Byrne et al. | 473/340 |

FOREIGN PATENT DOCUMENTS

| | | | |
|---|---|---|---|
| EP | 0908263 | | 4/1999 |
| JP | 56-9085 | * | 1/1981 |
| JP | 56009085 | | 1/1981 |
| JP | 09-283812 | * | 10/1997 |
| JP | 11-043760 | * | 2/1999 |
| JP | 2002-000971 | * | 1/2002 |

OTHER PUBLICATIONS

U.S. Appl. No. 60/343,865.*

* cited by examiner

*Primary Examiner*—John J. Zimmerman
(74) *Attorney, Agent, or Firm*—Seed IP Law Group PLLC (57) ABSTRACT

A method of forge welding laminates of titanium and titanium alloys includes interleaving first and second pluralities of metal pieces in an enclosure, filling the enclosure with an inert gas, heating the enclosure and the first and second pluralities of metal pieces, and mechanically pressing the enclosure on a first axis with a force sufficient to cause the first and second pluralities of metal pieces to forge-weld together. The first and second pluralities of metal pieces may be metallurgically dissimilar from each other, and may each comprise a percentage of titanium.

34 Claims, 11 Drawing Sheets

METAL LAMINATION METHOD AND STRUCTURE

CROSS-REFERENCE TO RELATED APPLICATION

This application claims the benefit of U.S. Provisional Patent Application No. 60/361,070 filed Feb. 27, 2002, where this provisional application is incorporated herein by reference in its entirety.

BACKGROUND OF THE INVENTION

1. Field of the Invention

This invention is in the field of metal laminates, and more particularly relates to metal laminate structures of nonferrous, noncorrosive metals.

2. Description of the Related Art

A number of conventional techniques exist for the bonding of metals to achieve composite or laminate products. One technique is forge welding, which is used for the manufacturing of compound steel, wherein two types of steel are bonded together in open atmosphere to produce a composite product. In order to achieve such a composite, plates or layers of steel are heated to a high temperature and pressed together, using a pressure sufficient to cause the plates to form a molecular bond. One of the advantages of forge-welding over other methods of joining metals is that the bond is achieved without the use of additional metal. This may be contrasted with arc welding, for example, where an electrode of a metal that is compatible with the metals to be joined is heated by the passage of an electric current, to melt and become part of the welded joint. This alters the chemical makeup of the metal at the joint. Physical characteristics, as well as the appearance of the joined parts are changed. While this may be desirable in some cases, in others it is not acceptable. A properly forge-welded joint is extremely strong while retaining all the physical characteristics of the component parts, as well as presenting an attractive (sometimes invisible) bond.

This type of forge-welding has been practiced for many years and is also known in the industry as pattern welding. Another common term for this technique is damascened forging, with steel made by this technique being referred to as Damascus steel. Knife blades made from Damascus steel have been used for many years and are valued for the decorative and artistic qualities, as well as for the high quality of the blade.

One of the benefits of Damascus or forge welded steel is that a blade made using this technique tends to enjoy the advantages of each of the component ingredients. For example, a steel alloy having a high degree of flexibility may be combined in alternating layers with an alloy having superior hardness. The result is a blade of great flexibility that also takes and holds a sharp edge. It is not fully understood how characteristics of individual alloys are imparted to such a composite, when a single alloy composed of the same ingredients and in the same proportions as the combination of the two component alloys does not, generally, capture the combination of characteristics. Nevertheless, the phenomenon has been known and exploited by master smiths for centuries.

Regrettably, the techniques used to make Damascus steel are only effective on a very limited group of steel products. Only those steels that have a very high workability and low alloy content are able to be worked with this process.

Currently the knife-making industry is limited to unalloyed or alloyed carbon steels for decorative composite materials. This means that these components or materials are prone to corrosion and can add significant weight to the final product. Forge welding of other metals has been attempted, without good results. For example, efforts to achieve a reliable forge welded laminate of titanium or titanium alloys has been generally unsuccessful.

In an attempt to forge-weld other steel alloy materials, different techniques have been attempted. See, for example, U.S. Pat. No. 5,815,790. This patent describes a technique in which two stainless steel materials, at least one of which is in powder form, are placed under isostatic pressure while being heated to a high temperature. Working with metals in powdered form is difficult and expensive.

Hot isostatic compaction, or hot isostatic pressing (HIP) is known in the industry, and used, for example, to form parts from metallic powders, including powders of steel, aluminum, and titanium. HIP requires a cylindrical pressure vessel into which the material to be processed is inserted. The interior of the vessel (and the material) is heated to a high temperature, and the atmosphere of the vessel is pressurized to pressures sufficient to compact a powdered metal into a solid form. The HIP process requires expensive machinery and has limits to the size of the parts that can be made thereby, since a pressure vessel capable of withstanding huge pressures is required for the process. The vessel must be internally insulated from the heat of the process, to prevent the extreme temperatures from weakening the walls of the vessel under pressure. As the size of the vessel increases in a linear manner, the required thickness and strength of the vessel walls increases exponentially. This places a practical limit on the maximum size of parts that can be produced. Currently, the maximum working size is on the order of around four feet in diameter. It will be recognized that, as the size increases, the cost of owning and operating such a device also increases. Additionally, the materials in a pressure vessel cannot be handled or manipulated in any way until the procedure is complete. These issue, individually or in combination, make the use of HIP expensive and complicated for small parts, and impossible for large ones.

BRIEF SUMMARY OF THE INVENTION

According to one embodiment of the invention, a method is provided, comprising the steps of arranging first and second metal pieces in an enclosure, filling the enclosure with an inert gas, heating the enclosure and the first and second pieces of metal, and mechanically pressing the enclosure on a first axis with a force sufficient to cause the first and second pieces of metal to forge-weld together. The first metal piece may be one of a first plurality of metal pieces and the second metal piece may be one of a second plurality of metal pieces, with the arranging step comprising interleaving the first and second pluralities of metal pieces with each other. The first and second metal pieces, or the first and second pluralities of metal pieces may be metallurgically dissimilar from each other. Additionally, each of the first and second metal pieces, or each of the first and second pluralities of metal pieces may comprise a percentage of titanium.

Another embodiment of the invention provides a metal laminate, including a first plurality of layers of a first metal containing titanium, a second plurality of layers of a second metal containing titanium, the second metal having a chemical composition different from a chemical composition of the first metal, with the first and second pluralities of layers interleaved with each other, and with each of the layers of the laminate having a forge welded bond with the layers contiguous thereto.

DETAILED DESCRIPTION OF THE INVENTION

Figure 1:
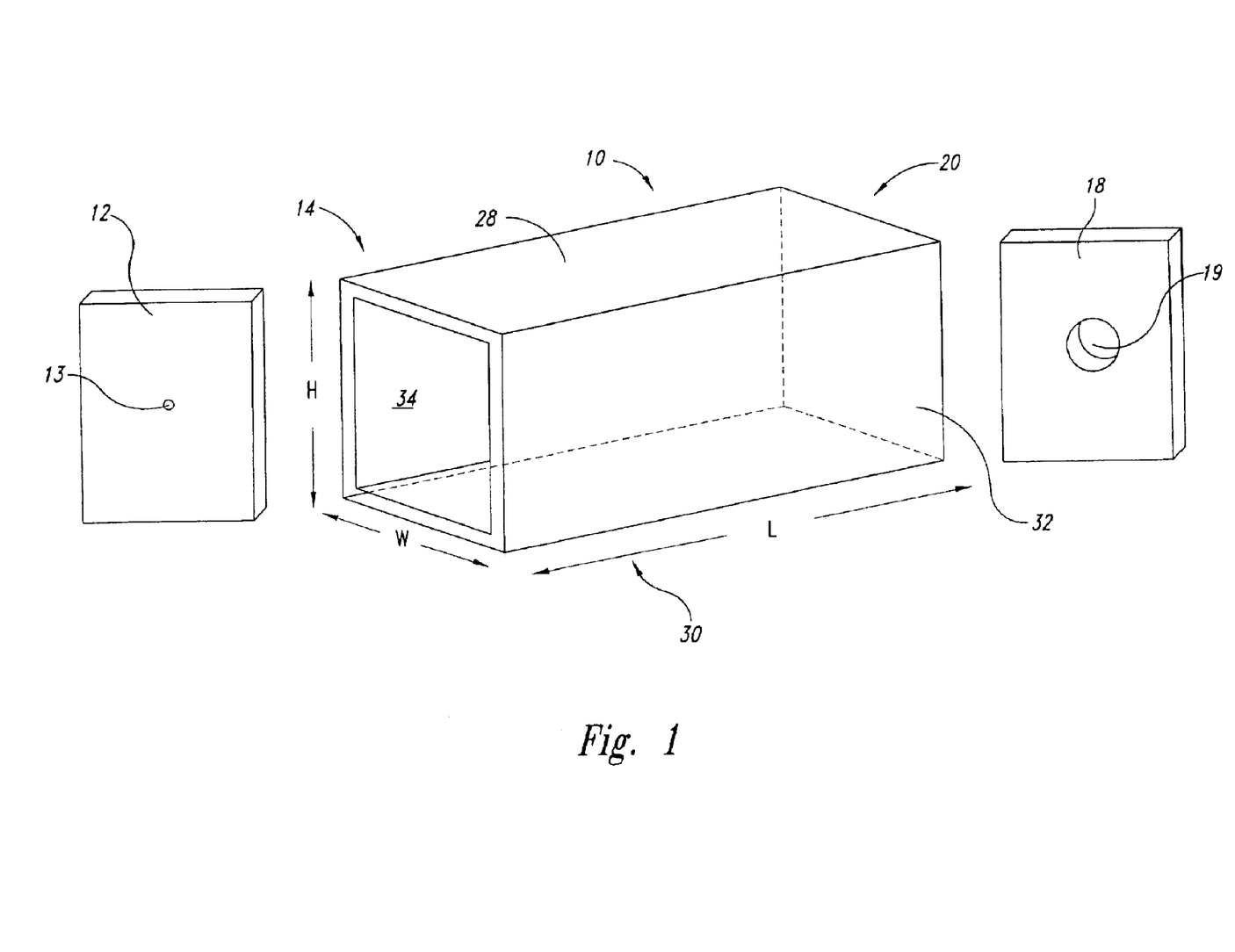
FIG. 1 includes a modified, exploded of an encapsulating chamber.

As is illustrated in FIG. 1, an encapsulating chamber or enclosure 10 is provided, which initially is open at both ends. The chamber 10 can be made of a mild steel box tube, or steel square or rectangular tubing of another type of metal as starting member. The chamber 10 has any desired height, width, and length. According to one embodiment, the width w is in the range of 1–2 inches, the height h is in the range of 2–4 inches, and the length l in the range of 4–10 inches. In one preferred embodiment, the rectangular tubing to form the chamber 10 has a width w on the inside of 1½ inches and ⅛ inch thick walls for an overall outside width w of 1½ inches. The inside height is 3 inches and the length is 6 inches.

Such material may be easily obtained from commercial metal supply companies. The chamber 10 has a front end 14, a rear end 20, sides 32, 34, a top surface 28 and a bottom surface 30. A front cap 12 is connected by any acceptable technique, such as welding, adhesive, strapping, or other attachment method to the front end 14. A rear cap 18 is coupled to the rear end 20 of the chamber 10 by any acceptable technique, such as welding, brazing, adhesive, strapping, or other known method. The front cap 12 and rear cap 18 have appropriate apertures 13 and 19, respectively, to permit selected gases to enter and exit. In one preferred embodiment, the front cap 12 has a small aperture to permit gases to escape under exhaust and the rear cap 18 has a larger aperture for input of gases in order to fill the chamber with the appropriate gas content during the treatment. The small hole in the front cap may be in the range of around ⅛–1½ inch in diameter and the rear hole in the range of ½–1 inch in diameter in one acceptable embodiment.

Figure 2:
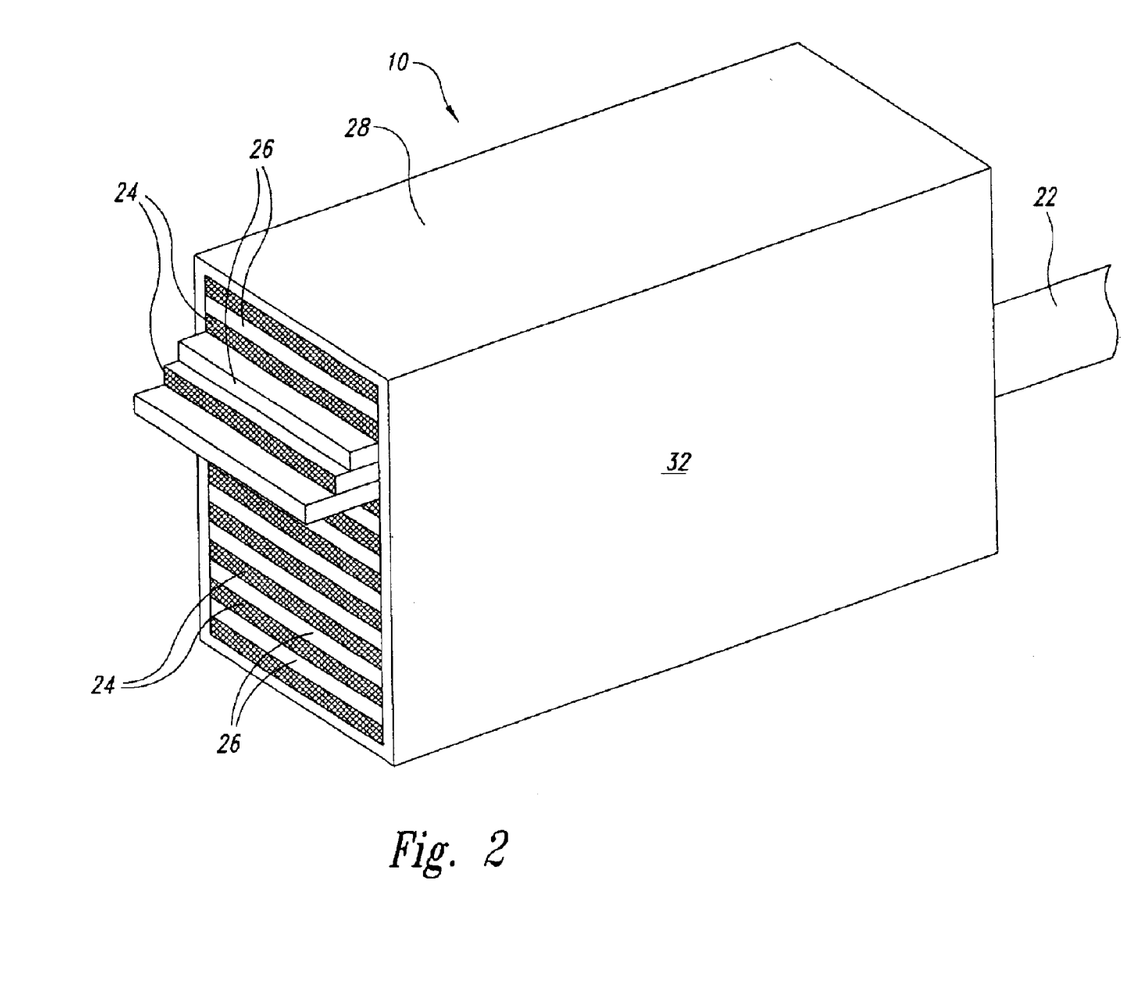
FIG. 2 is an isometric view of various alloys placed within the encapsulating chamber.
Figure 3:
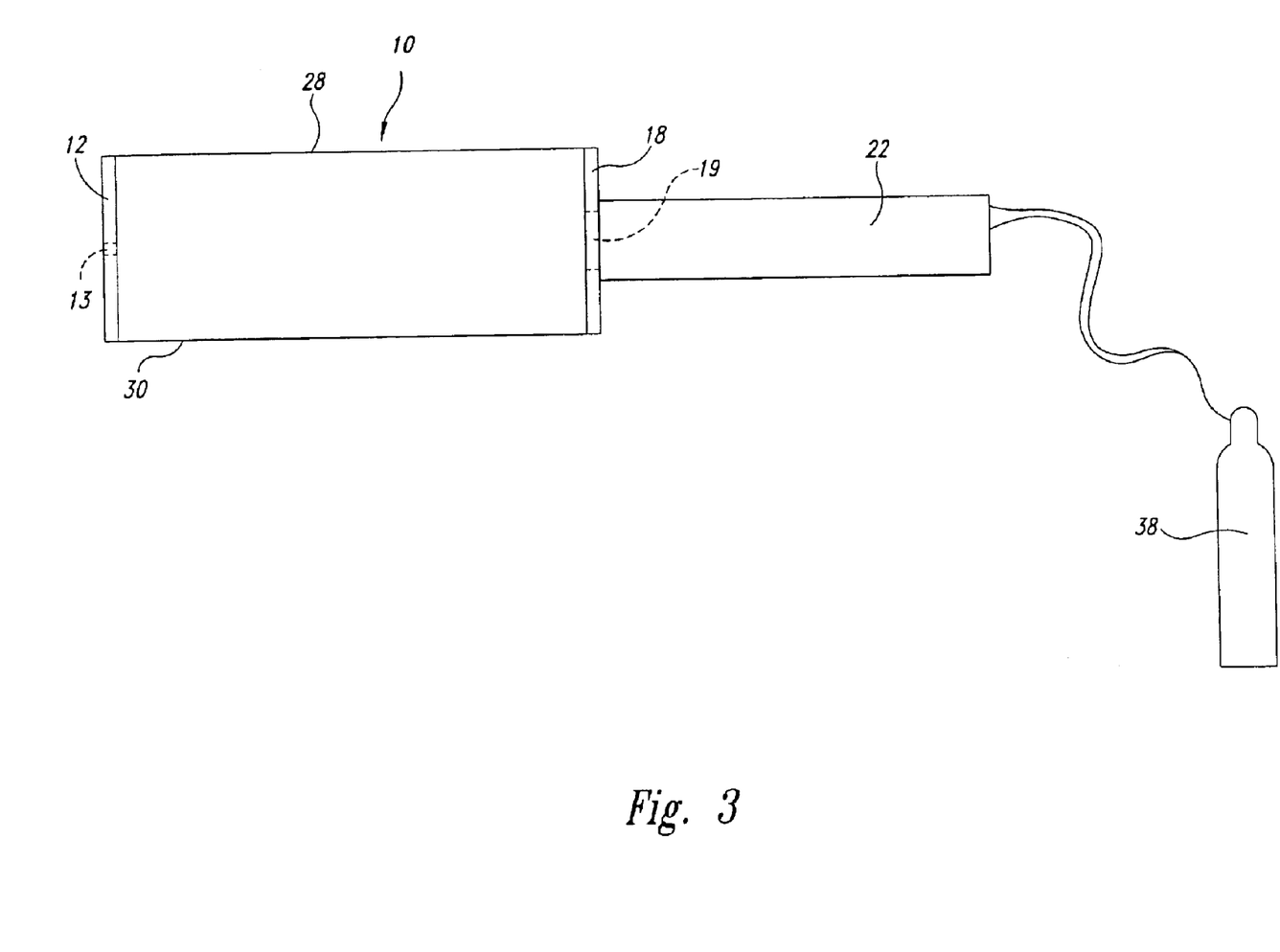
FIG. 3 is a side elevational view of the encapsulating chamber having an inert gas flow therein in preparation for treatment.

A handle 22 is connected to the chamber 10, as shown in FIGS. 2 and 3, preferably by connecting to the rear cap 18, by any appropriate mechanism. In one embodiment, the handle 22 is a metal pipe that is welded over the rear hole 19, which provides the dual purpose of serving as a handle for carrying the chamber as well as an inlet pipe for gas to be pumped into the chamber at a later stage in the process.

In carrying out the invention, the rear cap 18 is connected to the chamber 10 and the handle 22 is then connected to the rear cap 18, as seen, for example, in FIG. 3. The chamber is now prepared to receive the metal to be laminated into a single thick stock. Thin plates 24, 26 of selected alloys are stacked into the chamber 10. The plates 24, 26 stacked into the chamber 10 are of an acceptable size and shape to fit snugly into the chamber and to have a sufficient number within the stack for the desired number in the final laminate. According to one embodiment, the materials used are titanium alloys of various materials and compositions. One of the layers may be a commercial grade pure titanium. One acceptable grade is known in the industry as CP grade 1 titanium. This is a lighter colored metal 24 as indicated in FIG. 2. In between the generally pure titanium layer 24, an alloy layer 26 of titanium is placed. This alloy can be any acceptable alloy of titanium that is compatible with being bonded to the pure titanium in the process. One example includes an alloy known as titanium 6AL4V, meaning 6% aluminum and 4% vanadium with the remainder being titanium. Other acceptable alloys of titanium include titanium alloy 13AL3Z; titanium 13AL3V, titanium alloy 6AL, 3CR; and various combinations of titanium alloy with aluminum, vanadium, chromium, nickel, zinc, and other metals. Alternatively, another alloy is used in place of the pure titanium, such that two different alloys are bonded. In a further embodiment of the invention, more than two different metals are placed together in the chamber 10 to be bonded.

According to an embodiment of the invention, the sheets of titanium and titanium alloy may be scrubbed and cleaned, if desired, to remove all surface oxide layers and impurities, prior to loading them into the chamber 10. The scrubbing can take any acceptable form, such as a mechanical scrub, a wash, or a chemical bath. The scrub is selected to be sufficient to remove any oxide layers, nitride layers, or any other build-up of materials caused by dirt or by a reaction with the atmosphere, the result of which is to expose the pure metal. After being appropriately cleaned and scrubbed, the metal plates 24, 26 are placed into the chamber 10 in preparation for the bonding process. After the metal is placed in the chamber 10, the front cap 12 is bonded to the chamber 10 by any acceptable technique.

As shown in FIG. 3, an inert gas 38 is then pumped in at a selected rate sufficient to displace all nitrogen and oxygen in the chamber 10. The inert gas is preferably pumped in at a slow rate so as to evacuate all atmosphere and leave only pure inert gas within the chamber 10. Pumping at a slow rate ensures that pure inert gas will be present rather than a mixture of inert gas and ambient air, which contains some oxygen and some nitrogen. A preferred inert gas is argon, although other gases besides argon may be used. At this point in the process, the hole 13 may be plugged by any appropriate method. Alternatively, the hole 13 may be left open, in which case the inert gas may be pumped at a very low rate into the chamber 10 during the next steps of the process, to prevent recontamination of the atmosphere in the chamber.

In one embodiment, oxygen is removed from the chamber during pressing, since titanium oxidizes at high temperatures and oxygen may affect the process. Pumping inert gas into the chamber is one acceptable technique, but other methods that remove oxygen from around the metal pieces may also be used.

Once the chamber 10 is filled with inert gas, or otherwise evacuated of oxygen, it is then placed into a furnace to heat the capsule 10 and the plates 24, 26 therein to a selected temperature. In the case of titanium alloy, the preferred temperature is in the range of 1700–2000° F. The temperature is selected to be sufficiently high to permit bonding of the layers into a single laminate and yet is not so high that the pure titanium becomes liquid or too soft to hold firm shape during the lamination process. The temperature is selected to be sufficiently high to facilitate bonding of the titanium layers to each other to form the single laminate piece, without each of the layers losing their individual characteristics, such as color, position, etc.

Figure 4A:
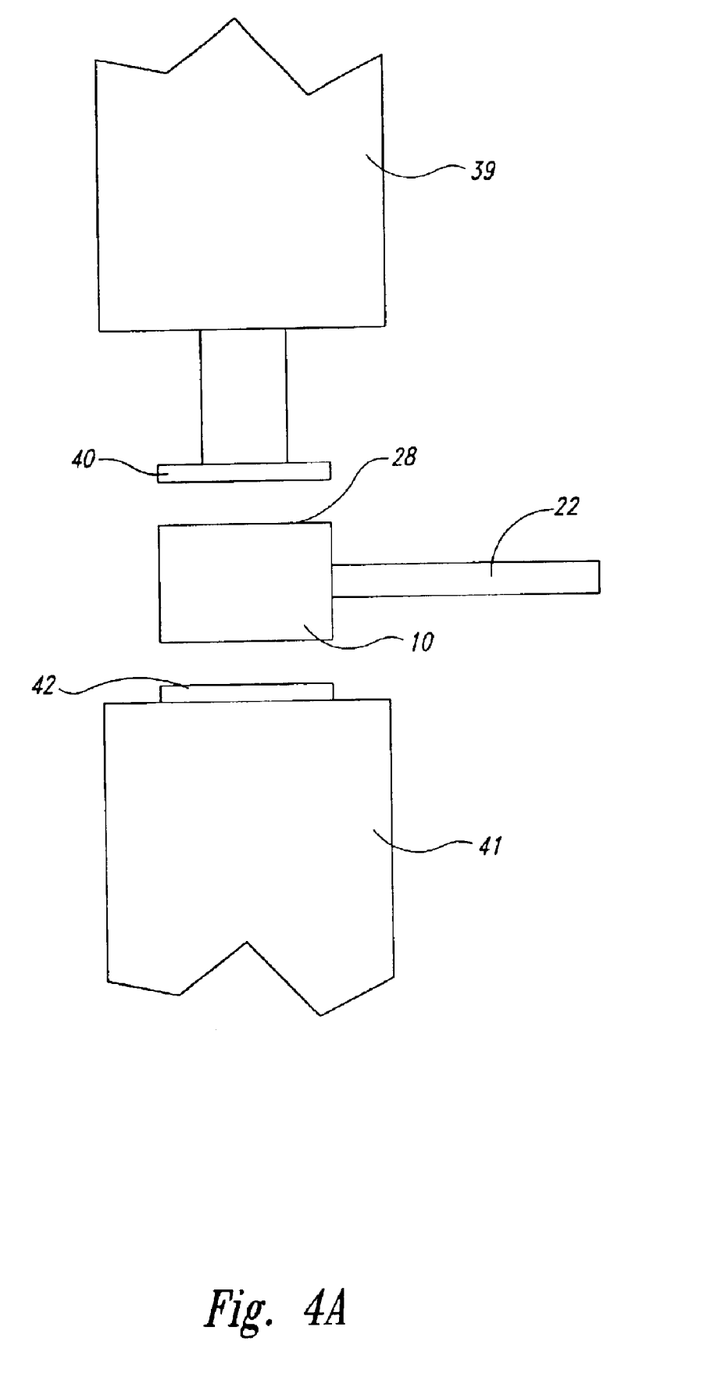
FIG. 4A illustrates one embodiment for placing the encapsulation chamber under high pressure.

When the chamber and its contents have reached a stable temperature inside the forge, the chamber 10 is removed from the forge. A pressure is then applied to cause the plates 24, 26 to bond to each other, forming, thereby, a single billet of laminated metal plates. In one acceptable technique, as illustrated in FIG. 4A, a high pressure hydraulic press 39 is used to apply force to the chamber 10. A die 40 is placed on the anvil of the high-pressure hydraulic press, and a die 42 is placed on the stand 41 and force is applied to the chamber 10 having the metal plates therein. Sufficient force is applied so as to slightly deform the chamber 10. For example, it may be pressed with sufficient force to reduce the height in the range of around ⅛–⅜ inch, with ¼ inch being preferred. The hydraulic press may exert in the range of 5 to 15 tons of force in such an example. In an alternative embodiment, the force may be applied by some other acceptable technique. For example, steel rollers, impact hammers, hammering by hand, or some other technique of applying sufficient force to bond the plates 24 and 26 to each other may be employed. This will also cause the sides of the chamber 10 to bulge and some of the metal in the middle portion may become slightly wider than their initial width of 1¼ inches.

If the hole 13 was not previously closed, the preceding pressure step is usually sufficient to have closed the hole. In any event, the plates 24, 26 are now bonded, so the pumped gas is no longer necessary.

Figure 4B:
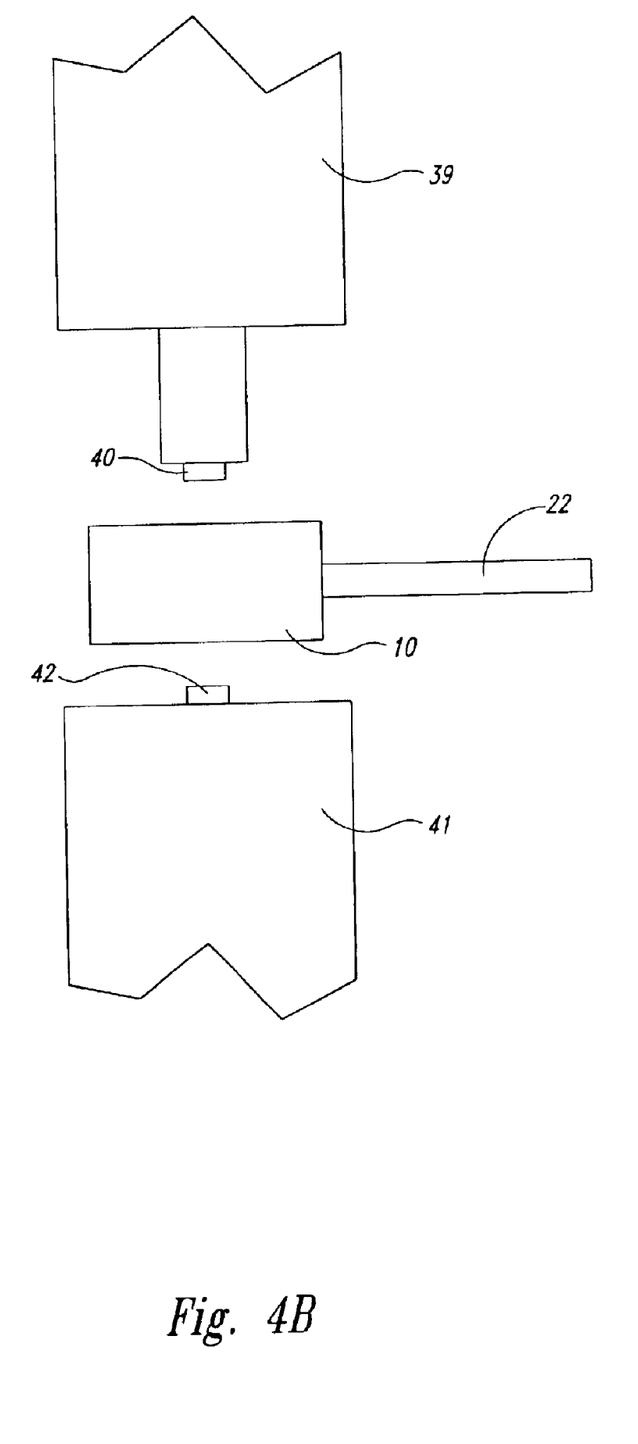
FIG. 4B illustrates a second embodiment for placing the encapsulation chamber under high pressure.

FIG. 4B illustrates an alternative shape for the dies 40 and 42. Rather than being a flat die that matches the shape of the top surface 28 of the chamber 10, it can be a square die having a surface area substantially smaller than the area of the top or bottom surfaces 28, 30 of the chamber 10. In other embodiments, the dies 40 and 42 may be spherical, conical, semi-round, or have other shapes as desired. In those embodiments where the surface area of the dies used to apply pressure is smaller than the surface areas of the respective surface 28, 30 of the chamber 10, the pressure is applied repeatedly to the chamber 10, progressing over the entire surface of the chamber, such that the entire top and bottom surfaces 28, 30 of the chamber 10 are subjected to the requisite pressure to effect the bonding of the plates 24, 26.

Figure 5A:
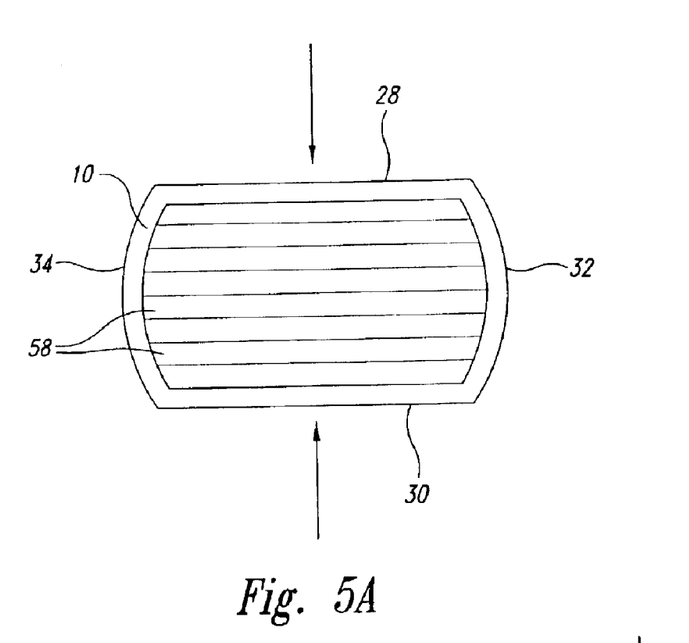
FIG. 5A is a side elevational view of the encapsulation chamber being placed under high pressure.

FIG. 5A illustrates the interior of the chamber 10 while force is being applied by hydraulic press 39. Under the constant pressure of the hydraulic press, additional heat is generated in the center of the stack. The force that compresses the top 28 and bottom 30 closer to each other by some distance will cause the sides 32 and 34 to bulge outward. Because the center portion of the stack is hotter, it is also softer. As a result, more bulge will generally occur in the softer inner layers 58 as shown in FIG. 5A. Alternative types of application of the force may cause slightly different shapes or bulging to occur in the chamber 10. For example, impact hammering may cause slightly more bulging at the top and bottom, whereas rolling may cause a more uniform bulge. Different types of machines for applying the force will cause different reactions in the laminate inside the chamber 10.

Figure 5B:
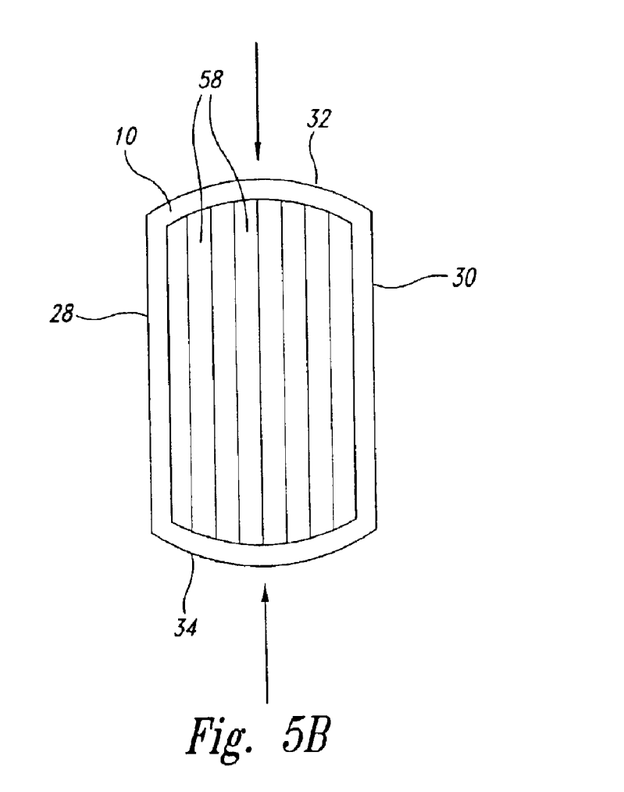
FIG. 5B is a side elevational view of the encapsulation chamber rotated 90° and placed under high pressure.

In some embodiments, the chamber 10 is then placed into the forge again and reheated and the pressure steps repeated, once again pressing the chamber 10 on the top surface 28 between dies 40 and 42 while it is hot. As shown in FIG. 5B, the chamber is then rotated 90° about an axis extending through the handle 22 so that the sides 32 and 34 are between the dies 40 and 42. The chamber 10 is pressed on the sides 32 and 34 so as to return the chamber to rectangular shape, pressing in the bulges that have occurred during the previous pressing steps.

The laminate is now bonded in the form of a single billet of metal. It is desired to remove the billet from the chamber 10. This is done by cutting the chamber 10 open by any acceptable method, such as a saw, cutting torch, or other technique. The chamber 10 may then be discarded leaving a billet of a laminate metal structure of titanium layers 58 in a single integral piece.

One purpose of the chamber 10 and the gas 38 is to prevent any reactive gasses, such as oxygen, from interfering with the bond between the plates 24, 26 of the billet, or from reacting with the heat to form oxides on surfaces of the plates. According to one embodiment, the chamber is formed from a titanium tube of a desired profile, into which are stacked additional titanium and titanium alloy plates. Alternatively, the chamber may be formed of individual pieces of titanium joined together to form an enclosure. Thus, this structure can be considered a chamber only in the broadest sense of being a structure that facilitates the removal or displacement of oxygen. The chamber is heated and pressed as described above with reference to FIGS. 4A–5B. An advantage of this embodiment is that the billet need not be removed from the chamber, but rather, the chamber becomes part of the billet. If it is desired, the side surfaces of the billet, corresponding to the sides 32 and 34 of the chamber of FIG. 1, may be removed to reveal the layers of metal. Alternatively, the sides may be left on as part of the billet, or removed at a later stage of manufacturing of the billet into a final product.

Figure 6:
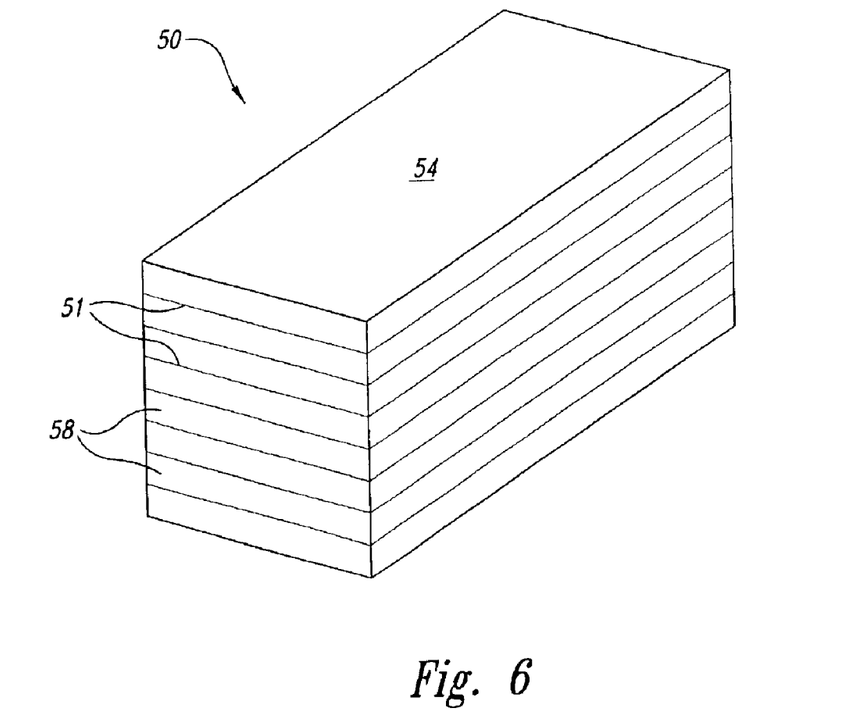
FIG. 6 is an isometric view of the final billet of laminate material.

As shown in FIG. 6, a single piece of metal composed of layers 58 has been obtained through the heat and pressure steps. The plates 24, 26 are now fully bonded and any further treatment is on the unified metal billet 50 having an upper surface 54. For purposes of clarity and economy, FIGS. 5–13 do not show the billet 50 as comprising dark and light layers representing different metal alloys, but only show lines 51 indicating boundaries between layers 58. However, it will be understood that each of the layers 58 of metal in the billet 50 will retain the appearance and characteristics of the particular metal or alloy plate from which it was formed.

Figure 7:
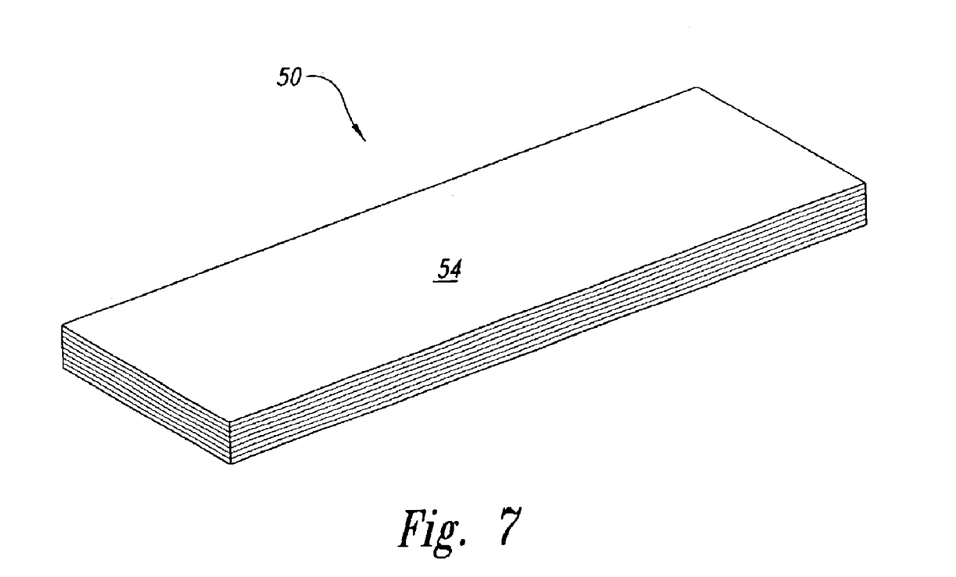
FIG. 7 is an isometric view of the elongated billet.

As shown in FIG. 7, according to one technique, the billet 50 is further shaped by appropriate rolling, pressing, or other techniques to flatten and shape it as desired. For example, it may be cold rolled or flattened to have a final length of 30–40 inches and a final thickness in the range of ½ to 1½ inches. Other metal working techniques may also be used to achieve a desired final shape for the billet, including pounding with a hammer on an anvil, pressing, hot rolling or other techniques.

Figure 8:
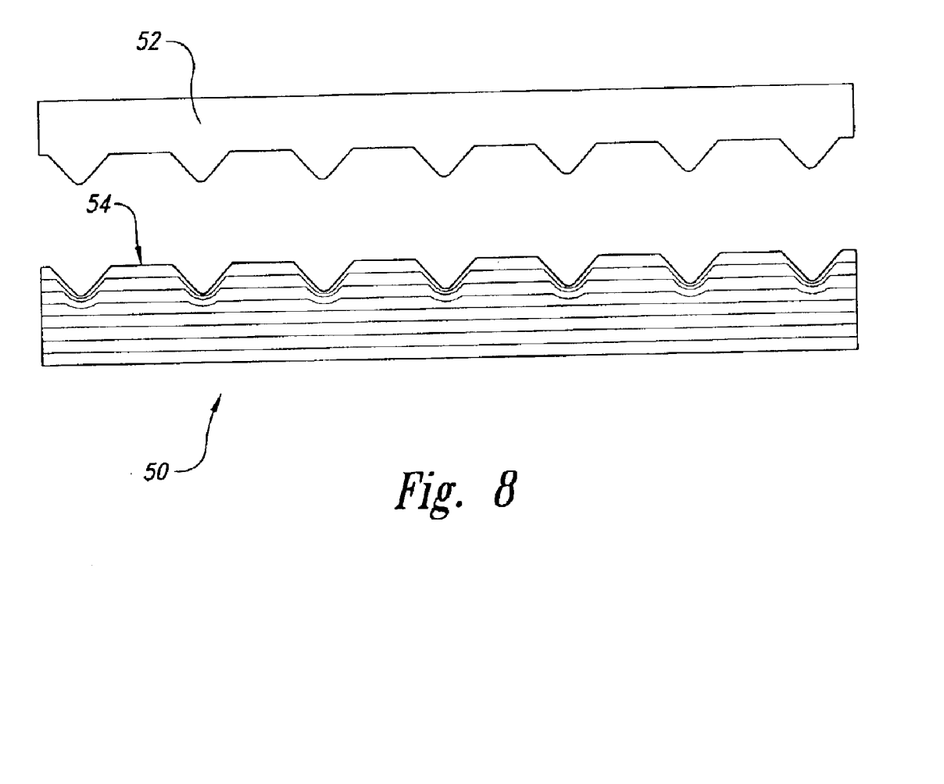
FIG. 8 is a side elevational view of an artistic pattern being pressed into the billet.
Figure 9:
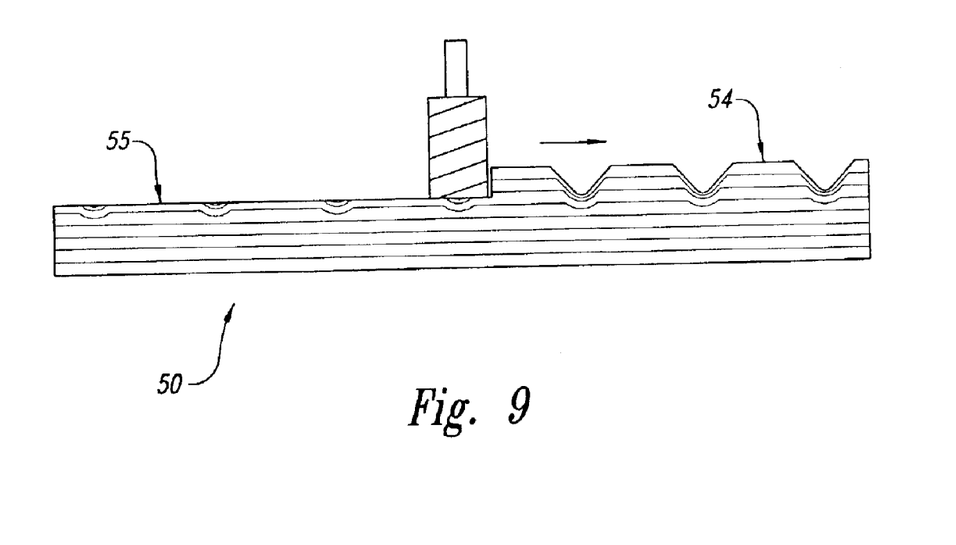
FIG. 9 is a side elevational view of the billet being machined to a desired shape and having a desired artistic pattern.

FIG. 8 shows an image being impressed into the upper surface 54 of the final billet using a die having a desired pattern. In the embodiment illustrated, a triangular profile is pressed into the final billet 50, after which it is machined to remove the upper surface and expose a decorative surface 55 based on the pattern that has been pressed therein. Other profiles may be pressed into the final billet, including square, round or oval profiles, or the like. Once the appropriate image has been pressed therein, the billet is processed to expose the underlying layers, such as by grinding, cutting, or other machine techniques, as shown in FIG. 9.

Figure 10:
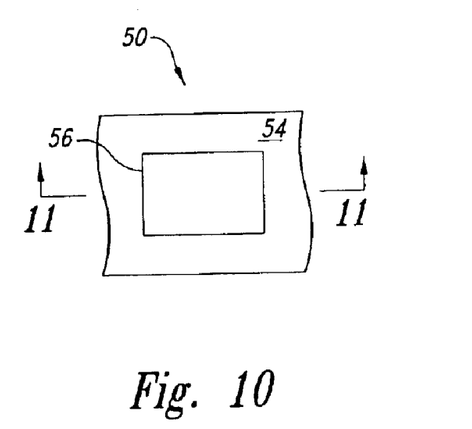
FIG. 10 illustrates, in plan view, a simple design pressed into a portion of the surface of the billet.
Figure 11:
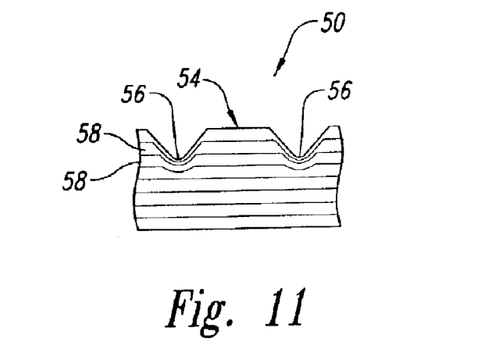
FIG. 11 is a cross-section of the portion of the billet of FIG. 10.
Figure 12:
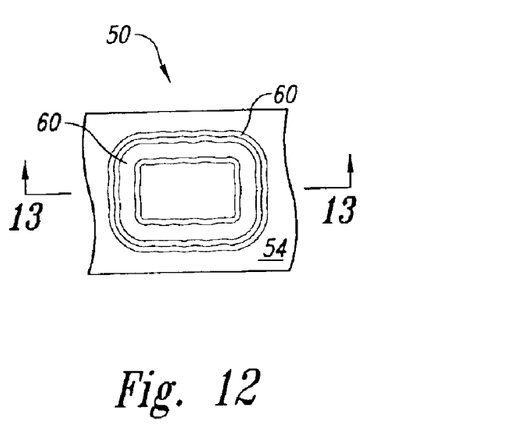
FIG. 12 is a plan view of the portion of the billet of FIG. 10, showing the appearance of the billet after the upper surface has been removed.
Figure 13:
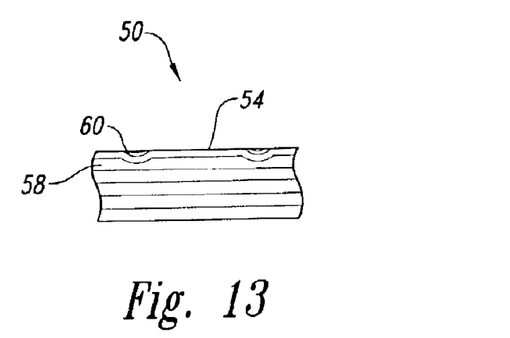
FIG. 13 is a cross-section of the billet of FIG. 12.

The shape pressed into the billet may have any desired design, such as a symbol or logo. FIG. 10 shows a plan view of a portion of a billet 50 such as the billet 50 pictured in FIG. 7, into the surface 54 of which a box shape 56 has been impressed. FIG. 11 shows, in cross section, the billet 50, with the impression 56 in the surface 54, and the effects thereof on the underlying layers 58. FIG. 12 shows the billet 50 after a selected amount of surface 54 has been removed, as described with reference to FIGS. 7 and 8, exposing the decorative surface 55, including lines 60 formed by the underlying layers 58. FIG. 13, shows a cross section of the billet 50 of FIG. 12, illustrating exposure of the surface 55 and the underlying layers 58 caused by the removal of the surface 54 to form lines 60.

After the billet has been appropriately shaped and decorated according to a desired aesthetic or artistic treatment, as shown in FIGS. 7–13, it may be treated by other artistic techniques. For example, it may be anodized at different voltages in order to provide a desired color pattern, tint or other effect. Additionally, heating at a medium temperature, for example 1,000° F., causes the titanium to take a rainbow appearance. Treating at higher temperatures causes it to darken somewhat, while treating at lower temperatures results in a lighter somewhat different pattern.

Heat, in the presence of oxygen will cause titanium to oxidize. Different alloys of titanium will oxidize to a greater or lesser degree at any given temperature, depending upon the presence of other metals, and depending upon the total percentage of titanium in the alloy. Thus, by heating the billet in open air, the exposed portions of the layers of titanium and its various alloys can be made to react to the oxygen in the air to take on contrasting colors and shades, for aesthetic appeal.

Other treatments, such as heating while applying pressure, twisting with or without heat, elongating, compressing, or other techniques, may be used in order to impart a desired artistic pattern into the billet. These techniques may be used on the billet at various stages in order to create different effects. For example, it may be applied to the billet of FIG. 6, the shaped billet of FIG. 7, or the billets of FIGS. 8–13 having a pattern impressed therein. Of course, in many embodiments, the elongated billet 50 of FIG. 7 with the appropriate heat treatments will already have a desired appearance, and additional patterns need not be formed; rather, the machining of the billet 50 to produce a finished product will create the artistic pattern without any further treatment. For example, the tapers and bevels that are part of the shape of a knife handle or a piece of jewelry will naturally expose layers in interesting and appealing patterns.

The final piece can be made to have an artistic design based on the color and selected patterns of the various alloys as well as the patterns that have been pressed or formed therein. It may be used to produce a wide range of finished products. For example, it may be used for the handle of a knife. It may be used for jewelry, such as rings, necklaces, pendants, pins, or other decorative metal ornaments. It may be used as a functional metal part and also as artwork on motorcycles, such as handles, exhaust pipes, or other decorative metal ware.

Figure 14A:
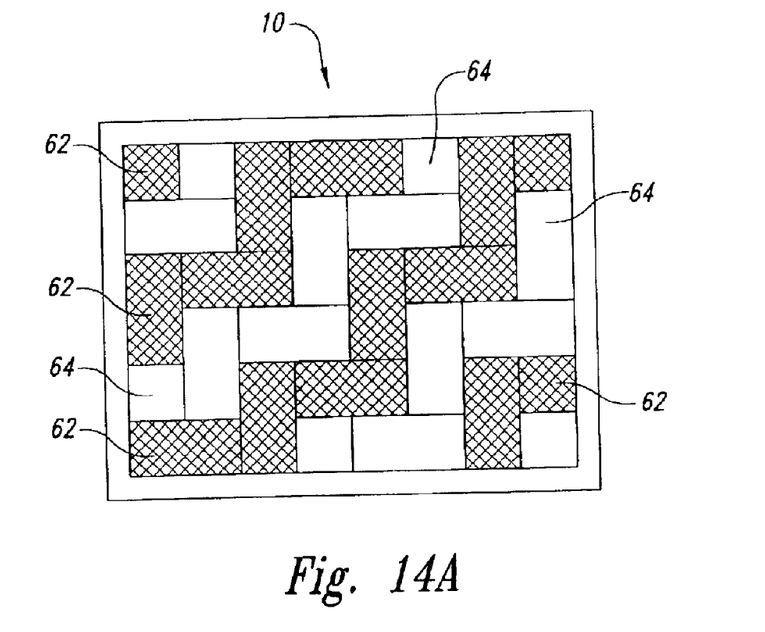
FIGS. 14A, 14B and 14C illustrate some possible arrangements of parts in the chamber of FIG. 1.
Figure 14B:
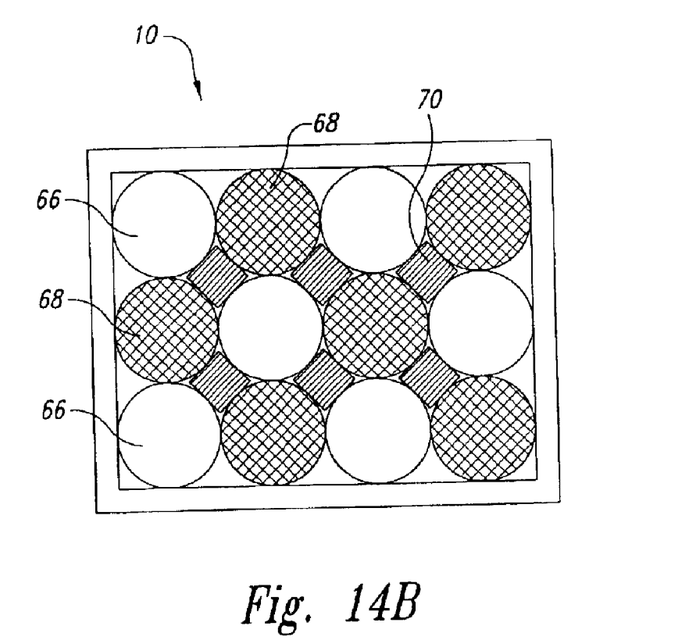
Figure 14C:
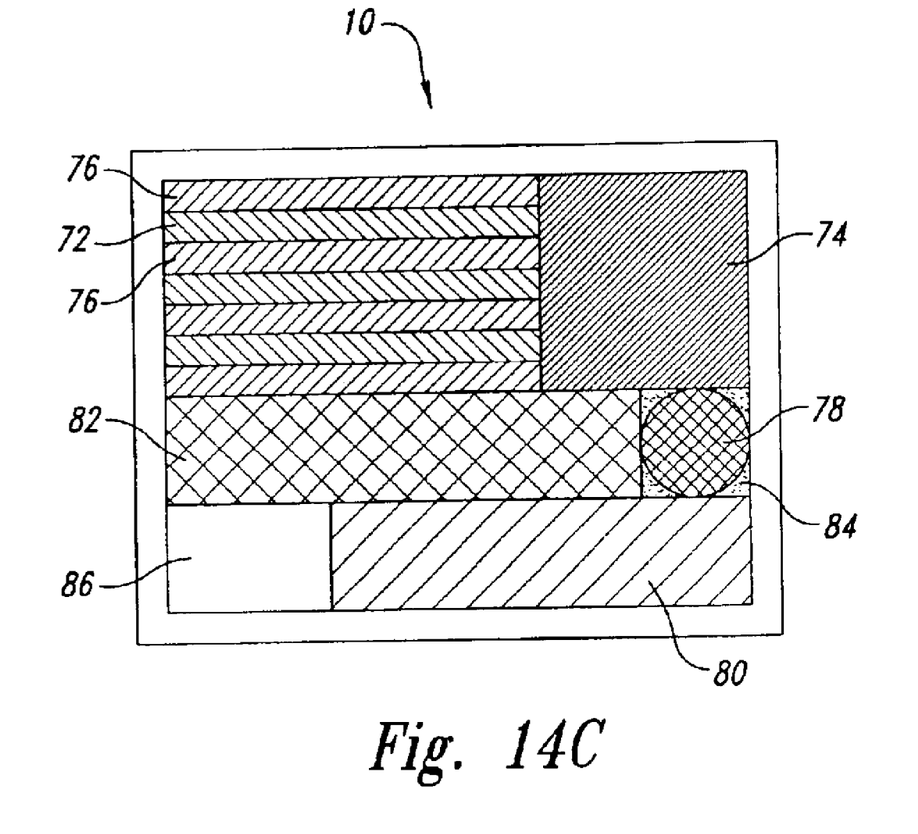

The invention has been described with reference to flat plates or layers 24, 26 in the chamber 10, as illustrated in FIGS. 1–13. It will be recognized that other shapes and patterns of material may be positioned within the chamber. A very simple forge-weld can be created using only two pieces of metal. Complex patterns can be created using different shapes and types of metal. FIGS. 14A, 14B and 14C illustrate many configurations that are possible. FIG. 14A shows an end view of the chamber 10 in which rectangular bars of two different compositions 62, 64 are positioned in a herringbone pattern. It is not necessary for the metals to be the same amount of each other or alternating in position. Rather, the same type of metal may be in greater quantities than other types of metal or two metals of the same type may be adjacent to each other. For example 30% of one type of metal and 70% of another type of metal may be used. FIG. 14B shows the chamber 10 in which round bars of two different compositions 66, 68 are alternated, with square bars 70 of a third composition positioned in the interstices between the round bars 66, 68. Other patterns include checkerboard, parquet, and concentric, in which round or square tubing of various dimensions is placed, one tube within another, in the chamber 10.

FIG. 14C illustrates another alternative embodiment of a regular pattern of metals placed in the chamber 10. In the example of FIG. 14C, numerous types of metals are provided, in a regular arrangement which is non-uniform. First metals 72 and 76 are stacked in the pattern as shown adjacent to which can be the same type of metal or, alternatively a second type of metal 74. If desired, a rod 78 of the same types of metal of 72 and 76 or alternatively a different type of metal may also be present in the chamber 10. In some embodiments, a powder 84 may exist around the rod 78 and in other portions of the chamber so as to provide an additional metal. The powder 84 can be the same type of metal as other metals or, alternatively may be of a different alloy or other metal in powder form. Of course, the embodiments of FIGS. 14A and 14B can also have powder metal interspersed between the various layers and solid metal members and still fall within the embodiments of the present invention. As also shown in FIG. 14C, additional metals 82 and 80 may also be present within the chamber 10 so that a plurality of different types of metals are forge welded together as explained herein. In some embodiments, voids may be present, such as void 86 so as to create a desired pattern. Alternatively, no voids are present in the chamber and, to the extent possible the chamber is filled with metallic alloys of a particular type according to a desired end pattern.

Thus, as shown in FIGS. 14A, 14B and 14C a plurality of different metals may be arranged in a regular pattern within the chamber in order to achieve a desired final result using the forge welding techniques as explained herein. The number of possible configurations is virtually infinite, with each configuration resulting in a unique pattern in a finished product.

The invention has the advantage of being composed of a lightweight, hard, and highly useful metal. It may be used in any application for which titanium alone is used since it has similar properties, characteristics, and hardness of titanium or of a titanium alloy. It thus may be the functional metal piece for any application in which a strong, lightweight metal part might be used. This ranges from metal blades for scissors, knives, gun barrels, and plate metal, to the metal parts for motorcycles, bicycles, automobiles, racecars, airplanes, and other products that use titanium as a structure component.

The invention may also have industrial applications, apart from the decorative and artistic appearance it lends to functional components. It has been observed that forge welded composites often combine the advantageous characteristics of their component layers in a single piece. Similarly, various titanium alloys have different advantages. For example, one alloy may have a greater flexibility than pure titanium or other titanium alloys, while another alloy is harder than pure titanium or other alloys. A third alloy may have superior tensile strength characteristics. Preliminary tests suggest that combinations of titanium alloys in forge welded composites, according to the invention, impart their respective characteristics to the final product. Thus, it is reasonable to expect that titanium parts of hitherto unattainable combined characteristics of strength, hardness, flexibility, or other desirable characteristics may be possible, by practice of the principles of the present invention.

The invention has been described with reference to a chamber having dimensions of around 2×4×10 inches. It will be understood that the same principles may be applied to manufacture large laminated panels or blocks of titanium. Using industrial equipment commonly available, panels or blocks having dimensions of many feet on a side may be produced in accordance with the principles of the invention, and at relatively low costs. Such panels and blocks may find many industrial applications, such as in the aerospace industry, where their unique and selectable characteristics may provide significant advantages over conventional materials for the manufacture of parts.

For example, for a particular component in an airplane wing, an alloy having desirable characteristics of flexibility is chosen. However, the same alloy may not have an adequate degree of tensile strength, so the component must be made more massive than is optimal, to impart the necessary strength. In contrast, it may be possible to laminate layers of an alloy having the desirable flexibility with an alloy having superior strength characteristics to manufacture a part that shares both virtues, and thus enable the use of a component having lower mass and weight that still exceeds the functional requirements of the component. Reduction of mass and weight is a constant and endless endeavor in aerospace products.

In the preferred embodiment, titanium and a titanium alloy are used as two alternating layers in composing the final billet 50. Alternatively, more than two different materials or alloys may be used. Such a use may include titanium and two or more different alloys, each having different characteristics. In further alternative embodiments, other metals besides titanium are used. Titanium is advantageous because it has the properties of being light in weight, noncorrosive in the elements, and non-magnetic. It may be desired to select a combination of metals that can be anodized to cause contrasting color variations between the metals, or that can otherwise be heat treated or hardened to vary the structural properties, as well as impart various patterns. Other metals that may be used include cobalt-based alloys, as well as other metals that have acceptable properties for the end uses as described herein.

All of the above U.S. patents, U.S. patent application publications, U.S. patent applications, foreign patents, foreign patent applications and non-patent publications referred to in this specification or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method, comprising:

arranging first and second metal pieces in an enclosure, each of the first and second metal pieces comprising a percentage of titanium;

replacing gasses in the enclosure with inert gas;

heating the enclosure and the first and second metal pieces; and mechanically pressing the enclosure on a first axis with a force sufficient to cause the first and second metal pieces to forge-weld together.

2. The method of claim 1 wherein the first metal piece is one of a first plurality of metal pieces, and the second metal piece is one of a second plurality of metal pieces, and wherein the arranging step comprises interleaving the first and second pluralities of metal pieces with each other.

3. The method of claim 2 wherein the first and second pluralities of metal pieces are metallurgically dissimilar from each other.

4. The method of claim 1 wherein:

the first metal piece is one of a plurality of metal pieces in powder form;

the plurality of metal pieces are formed from a metal containing titanium; and the first plurality of pieces and the second piece are chemically different from each other.

5. A method, comprising:

arranging first and second pluralities of metal pieces in a regular configuration such that the each of the first plurality of pieces is adjacent to and interleaved with individuals of the second plurality of pieces, wherein each of the first plurality of pieces is formed of a first composition of metal including titanium and wherein each of the second plurality of pieces is formed of a second composition of metal including titanium, different from the first composition;

surrounding the first and second pluralities of metal pieces with an inert gas;

heating the first and second pluralities of metal pieces to a temperature exceeding 1000° F.; and pressing, while the first and second pluralities of metal pieces are surrounded with the inert gas, the first and second pluralities of metal pieces together with a force, such that a bond is formed between adjacent pieces, forming a single billet of metal.

6. The method of claim 5, further comprising the step of arranging a third plurality of metal pieces in a regular configuration adjacent to and interleaved with the first and second pluralities of metal pieces, wherein each of the third plurality of pieces is formed of a third composition of metal including titanium, different from the first and second compositions.

7. The method of claim 5, wherein the arranging step includes the steps of placing the first and second pluralities of metal pieces within a metal enclosure, wherein the surrounding step includes pumping the inert gas into the enclosure through a first opening in the enclosure while venting atmosphere from the enclosure through a second opening in the enclosure, and wherein the pressing step includes pressing the enclosure.

8. The method of claim 7, further comprising removing the billet from the enclosure.

9. The method of claim 7 wherein the enclosure includes a handle affixed to an exterior surface of the enclosure.

10. The method of claim 8 wherein the handle comprises a pipe having first and second mouths at respective first and second ends thereof, the first end of the pipe affixed to the exterior surface of the enclosure such that the first opening in the enclosure opens into the first mouth of the pipe, and wherein the pumping step includes pumping the inert gas into the second mouth of the pipe, such that the gas passes through the pipe and into the enclosure via the first opening.

11. The method of claim 7 wherein the enclosure comprises a section of metal tubing.

12. The method of claim 7 wherein the enclosure is titanium.

13. The method of claim 12 wherein the billet includes the enclosure.

14. The method of claim 5 wherein each of the first and second pluralities of metal pieces is in the form of a flat plate, and wherein the arranging step comprises forming a stack of alternating pieces of the first and second pluralities of pieces.

15. The method of claim 5 wherein the pressing step comprises pressing the first and second pluralities of metal pieces on a first axis and pressing the first and second pluralities of metal pieces on a second axis.

16. The method of claim 5 wherein the pressing step is isostatic.

17. The method of claim 5 wherein the pressing step is mechanical.

18. The method of claim 5 further including:
repeating the pressing step.

19. The method of claim 18 wherein the repeating the pressing step includes passing the billet between rollers having a distance therebetween less than a thickness of the billet.

20. The method of claim 5 further comprising:
deforming a first surface of the billet according to a selected pattern.

21. The method of claim 20 further comprising:
removing a portion of the thickness of the billet, including the first surface.

22. The method of claim 5 further including:
treating the billet to induce ones of the first plurality of metal pieces to acquire a first appearance and ones of the second plurality of metal pieces to acquire a second appearance.

23. The method of claim 22 wherein the treating step includes:
anodizing the billet at a selected voltage.

24. The method of claim 22 wherein the treating step includes oxidizing the billet at a selected temperature.

25. A method, comprising:
organizing each of a plurality of metal pieces into an arrangement selected to produce an aesthetically pleasing result, each of the plurality of metal pieces being formed of a metal containing titanium;

replacing oxygen gas from around the arrangement with inert gas;

heating the arrangement; and pressing the arrangement with a pressure sufficient to cause each of the plurality of metal pieces to bond to those pieces of the plurality immediately contiguous thereto.

26. The method of claim 25 wherein the organizing step comprises enclosing the arrangement in a metal enclosure, and wherein the pressing step includes pressing the enclosure.

27. The method of claim 26 wherein the surrounding step comprises pumping the inert gas into the enclosure through a first opening therein and venting the enclosure through a second opening therein to remove oxygen gas.

28. The method of claim 26 wherein the enclosure comprises such ones of the plurality of metal pieces as are positioned on an outer perimeter of the arrangement.

29. The method of claim 25 wherein each of a first portion of the plurality of metal pieces is formed of a metal having a chemical composition different from each of a second portion of the plurality.

30. The method of claim 7 wherein the inert gas is argon.

31. The method of claim 7 wherein the surrounding step is begun prior to beginning the pressing step, and wherein the surrounding step is continued after the pressing step is begun.

32. A method, comprising:
arranging first and second metal pieces in an enclosure;

heating the enclosure and the first and second metal pieces;

pressing the enclosure with a force sufficient to cause the first and second metal pieces to forge-weld together; and replacing gasses in the enclosure with inert gas, the replacing step commencing prior to the pressing step and continuing until after the pressing step commences.

33. The method of claim 32 wherein the first and second metal pieces are ones of first and second pluralities of metal pieces, respectively, and wherein the first and second pluralities are dissimilar metals.

34. The method of claim 32 wherein the first and second metal pieces each comprises a percentage of titanium.

* * * * *

UNITED STATES PATENT AND TRADEMARK OFFICE
CERTIFICATE OF CORRECTION

| | |
|---|---|
| PATENT NO. | : 6,857,558 B2 |
| APPLICATION NO. | : 10/375525 |
| DATED | : February 22, 2005 |
| INVENTOR(S) | : Robert Thomas Ferry, III et al. |

Page 1 of 1

It is certified that error appears in the above-identified patent and that said Letters Patent is hereby corrected as shown below:

<u>Column 10</u>
Lines 33-40,
"The method of claim 1 wherein: the first metal piece is one of a plurality of metal pieces in powder form; the plurality of metal pieces are formed from a metal containing titanium; and the first plurality of pieces and the second piece are chemically different from each other."
Should be omitted Signed and Sealed this Twenty-first Day of August, 2007

JON W. DUDAS
*Director of the United States Patent and Trademark Office*